(12) United States Patent
Petzoldt

(10) Patent No.: US 6,564,729 B1
(45) Date of Patent: May 20, 2003

(54) VACUUM SEED METERING ASSEMBLY

(76) Inventor: Mark R. Petzoldt, Rte. 3 Box 31, Marshall, MO (US) 65340

( * ) Notice: Subject to any disclaimer, the term of this patent is extended or adjusted under 35 U.S.C. 154(b) by 0 days.

(21) Appl. No.: 10/086,828

(22) Filed: Mar. 1, 2002

(51) Int. Cl.[7] .................................................. A01C 7/04
(52) U.S. Cl. ........................................ 111/179; 221/211
(58) Field of Search ........................... 111/77, 179, 182, 111/181, 180, 178, 74; 221/211

(56) References Cited

U.S. PATENT DOCUMENTS

| | | |
|---|---|---|
| 4,085,862 A | 4/1978 | Steffen |
| 4,145,980 A | 3/1979 | Boots |
| 4,306,509 A | 12/1981 | Hassan et al. |
| 4,449,642 A | 5/1984 | Dooley |
| 4,469,244 A | 9/1984 | Maury |
| D284,667 S | 7/1986 | Bliskey et al. |
| 5,740,747 A | 4/1998 | Stufflebeam et al. |

Primary Examiner—Christopher J. Novosad

(57) ABSTRACT

A vacuum seed metering assembly for evenly distributing seeds from a seed hopper includes a rotating perforated drum and a pair of stationary walls forming a suction area and a release area inside the drum. The suction area is adjacent a seed hopper such that individual seeds are held to apertures in the drum by suction as the apertures pass by the seed hopper. As the drum rotates, each seed is released into an associated distribution tube when the aperture passes into the release area.

13 Claims, 3 Drawing Sheets

VACUUM SEED METERING ASSEMBLY

BACKGROUND OF THE INVENTION

1. Field of the Invention

The present invention relates to seed planters and more particularly pertains to a new vacuum seed metering assembly for evenly distributing seeds from a seed hopper.

2. Description of the Prior Art

The use of seed planters is known in the prior art. U.S. Pat. No. 5,740,747 describes a device for metering seeds using a vacuum and a vibrational apparatus for facilitating the release of the seeds. Another type of seed planter is U.S. Pat. No. 4,085,862 which focuses on controlling a variable speed of a seed distribution drum to evenly distribute seeds. U.S. Pat. No. 4,469,244 a seed distribution assembly that uses a rotary apertured disk and adjustable pivoted selector plates. U.S. Pat. No. 4,306,509 discloses a vacuum drum planter utilizing manifolds within the drum and cams to interrupt the vacuum. U.S. Pat. No. 4,449,642 shows a planter using vacuum sower discs. U.S. Pat. No. Des. 284,667 discloses an ornamental design for a walk behind seeder and fertilizer.

While these devices fulfill their respective, particular objectives and requirements, the need remains for a vacuum seed metering assembly that provides reliable metering of seeds without overly complex vacuum and release mechanisms.

SUMMARY OF THE INVENTION

The present invention meets the needs presented above by providing a rotating perforated drum and a pair of stationary walls forming a suction area and a release area inside the drum. The suction area is adjacent a seed hopper such that individual seeds are held to apertures in the drum by suction as the apertures pass by the seed hopper. As the drum rotates, each seed is released into an associated distribution tube when the aperture passes into the release area.

An object of the present invention is to provide a new vacuum seed metering assembly that permits use of interchangeable drums, each having an associated aperture size and/or shape corresponding to a desired type of seed being planted.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

The objects of the invention, along with the various features of novelty which characterize the invention, are pointed out with particularity in the claims annexed to and forming a part of this disclosure.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
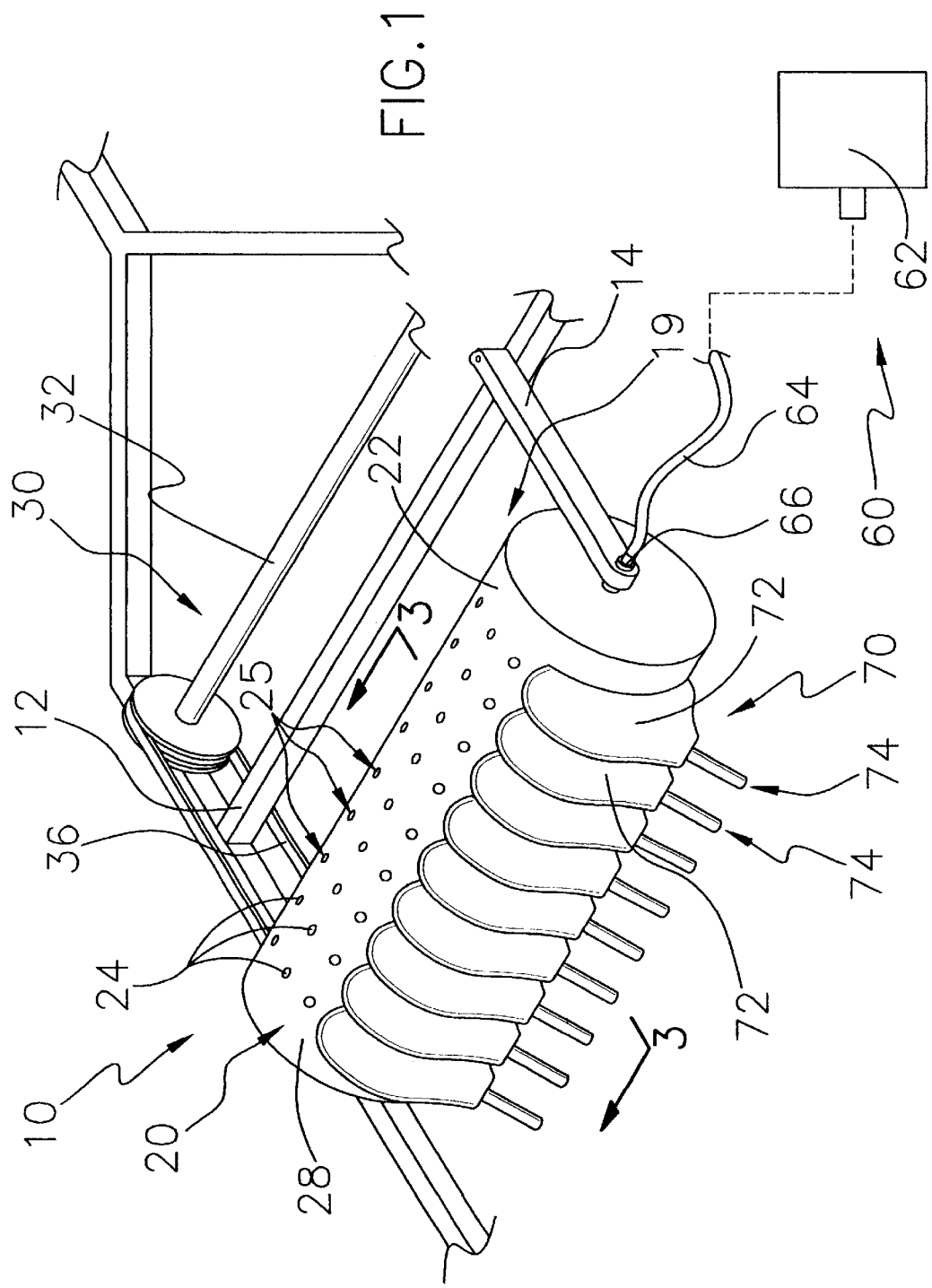
FIG. 1 is a perspective view of a new vacuum seed metering assembly according to the present invention and with the seed hopper removed to show detail.
Figure 2:
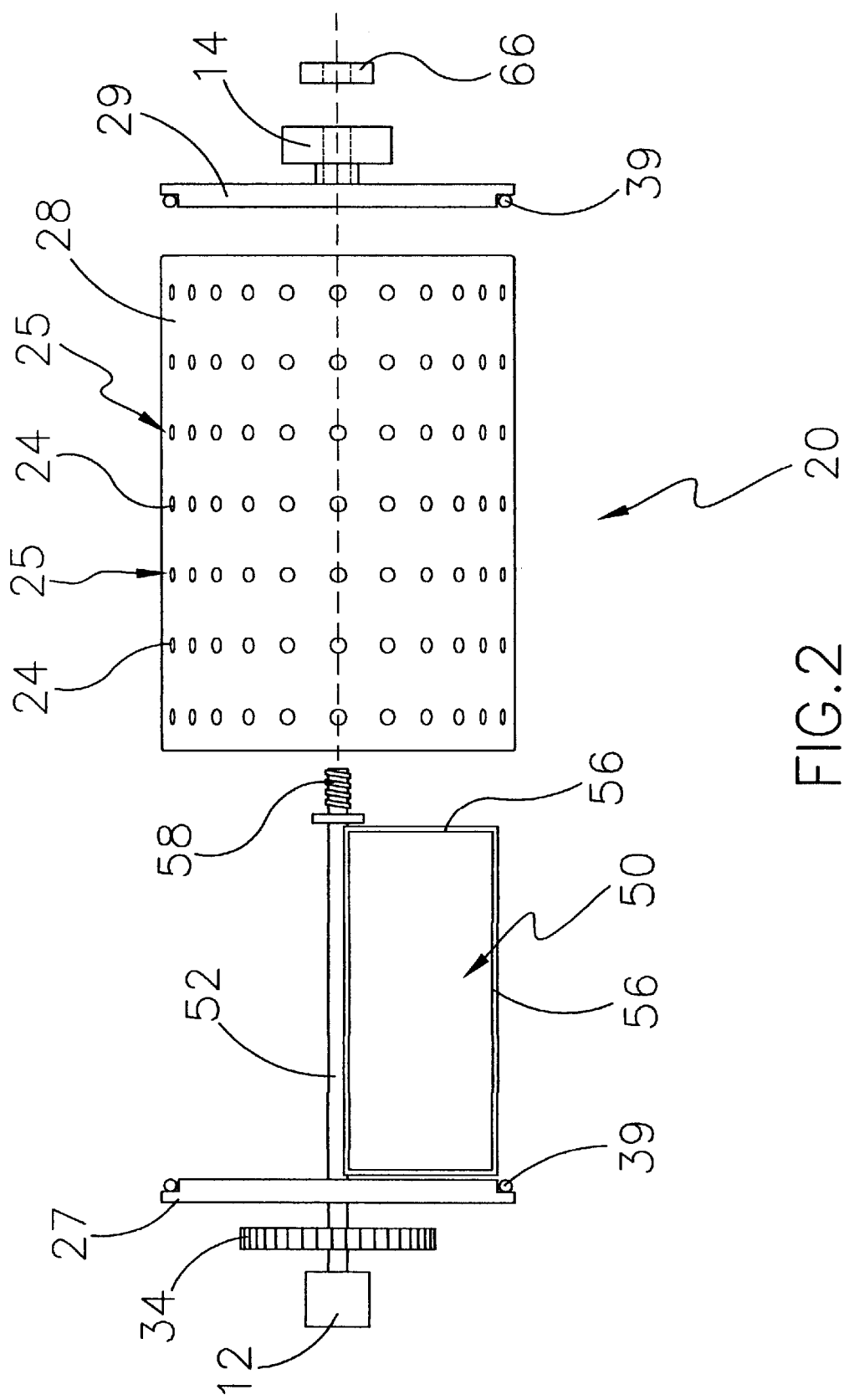
FIG. 2 is an exploded front view of the present invention.
Figure 3:
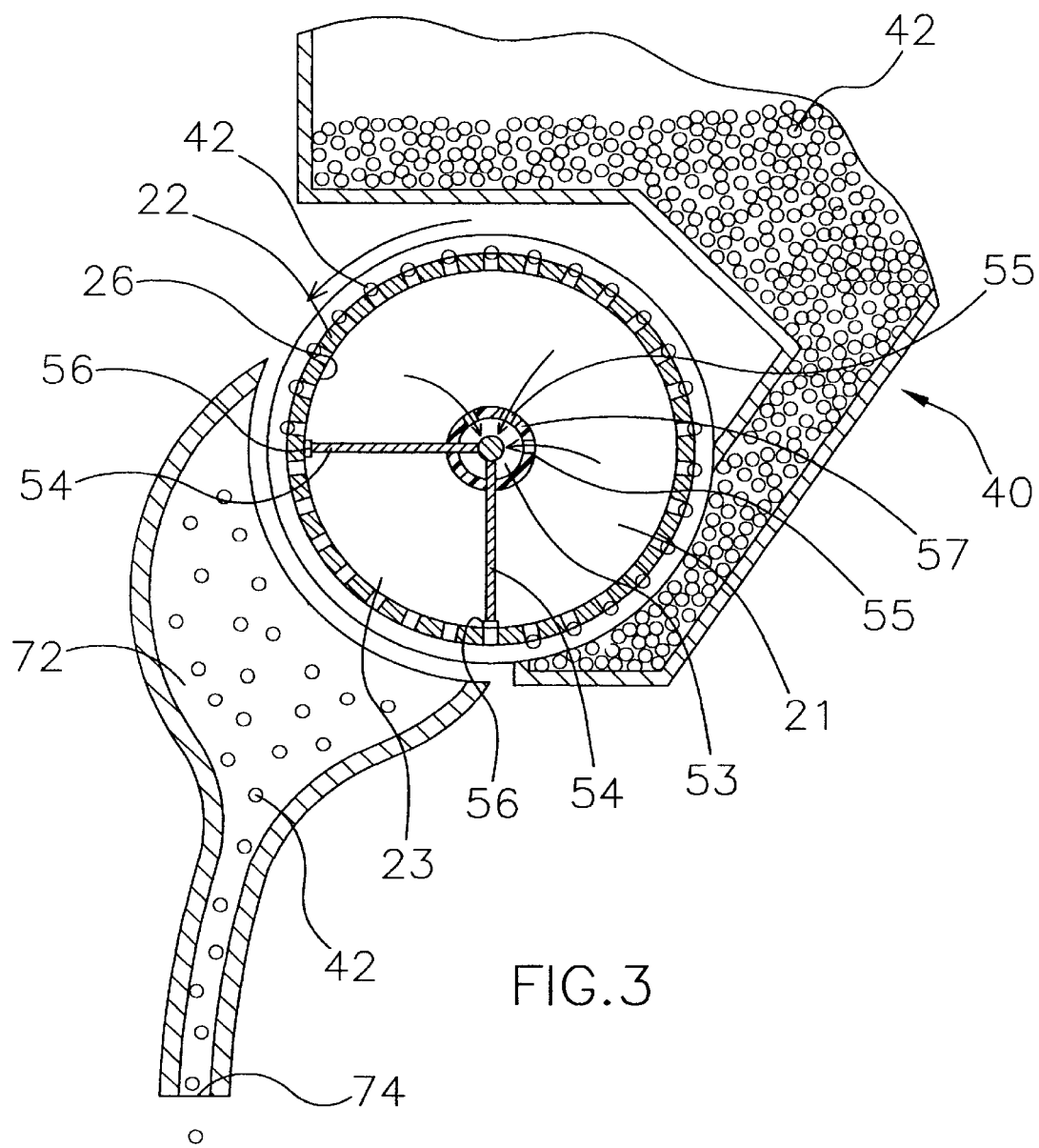
FIG. 3 is a cross-sectional view of the present invention taken along line 3—3 of FIG. 1.

With reference now to the drawings, and in particular to FIGS. 1 through 3 thereof, a new vacuum seed metering assembly embodying the principles and concepts of the present invention and generally designated by the reference numeral 10 will be described.

As best illustrated in FIGS. 1 through 3, the vacuum seed metering assembly 10 generally comprises a frame 12 designed for being moved over a ground surface. Typically, the frame is part of a wheeled trailer. The assembly 10 further includes a rotatable drum assembly 20 coupled to the frame 12. The rotatable drum assembly 20 includes a perimeter wall 22 that has a plurality of apertures 24. A rotational drive means 30 is provided for rotating the rotating drum assembly 20. The rotational drive means 30 is coupled to the frame 12. A seed hopper 40 is positioned adjacent the rotatable drum assembly 20 such that the seed hopper 40 is positioned for holding a plurality of seeds 42 adjacent to the perimeter wall 22. An interior wall assembly 50 is positioned in the rotating drum assembly 20 and is coupled to the frame 12 such that the perimeter wall 22 rotates with respect to the interior wall assembly 50. The interior wall assembly 50 sealingly engages an interior surface 26 of the rotating drum assembly 20. Thus, the interior wall assembly 50 defines a first chamber 21 and a second chamber 23 within the rotating drum assembly 20.

A vacuum assembly 60 is operationally coupled to the rotating drum assembly 20 and in environmental communication with the first chamber 21. Thus, individual seeds 42 in the seed hopper 40 are held against the perimeter wall 22 by suction through the apertures 24 when the apertures 24 are adjacent to the first chamber 21.

A distribution assembly 70 is positioned adjacent to the rotating drum assembly 20 and adjacent to the second chamber 23. Thus, the seeds 42 held against the perimeter wall 24 are released into the distribution assembly 70 when the apertures are adjacent to the second chamber 23.

The apertures 24 are arranged into a plurality of rows 25. Each of the apertures 24 is evenly spaced between adjacent apertures 24 in each of the rows 25. The apertures 24 in each row 25 may also be aligned or offset with respect to the apertures 24 of an adjacent row as desired.

The distribution assembly 70 includes a plurality of distribution tubes 72. Each distribution tube 72 includes an opening 74 positioned adjacent to an associated one of the rows 25.

In an embodiment, the rotating drum assembly 20 includes a first end member 27 rotatably coupled to the frame 12, a cylinder 28 forming the perimeter wall 22, and a second end member 29 rotatably coupled to a pivot arm 14 of the frame 12. The cylinder 28 is sealingly engageable to the first end member 27. The second end member 29 is pivotable via the pivot arm 14 to sealingly engage the cylinder 28 such that the first end member 27, the cylinder 28, and the second end member 29 form a rotatable drum 19.

The interior wall assembly 50 includes a stationary shaft 52 extending through the rotating drum assembly 20. A pair of walls 54 extend outwardly from the shaft 52 such that the walls 54 form an acute angle between the walls 54. Wall sealing members 56 are positioned on edges of the pair of walls 54 to contact the interior surface 26 of the cylinder 28 for preventing environmental communication between the first chamber 21 and the second chamber 23 as the drum 19 rotates.

The stationary shaft 52 includes a lumen 53 extending through the stationary shaft 52. The vacuum assembly 60 further includes a vacuum source 62 and a hose 64 extending from the vacuum source 62. The hose 64 is coupled to the stationary shaft 52 such that the vacuum source 62 is in environmental communication with the lumen 53. The stationary shaft 52 includes at least one shaft aperture 55 extending between the lumen 53 and an exterior surface 57 of the stationary shaft 52. Shaft aperture 55 is positioned such that the vacuum source 62 is in environmental communication with the first chamber 21. More than one shaft aperture may be used and due to debris and dust it can be advantageous to include a plurality of shaft apertures extending along the length of the stationary shaft and arranged into rows arranged radially around the portion of the shaft 52 adjacent the first chamber 21.

In an embodiment, the rotational drive means 30 utilizes a ground driven drive shaft 32 coupled to and extending transversely across the frame 12. A sprocket 34 is rotatably coupled to the frame 12 and rigidly coupled to the rotating drum assembly 20 at the first end member 27. Thus, when the first end member 27, the cylinder 28 and the second end member 29 are secured together the rotating drum assembly 20 rotates when the sprocket 34 is rotated. A drive chain 36 is operationally coupled the ground driven drive shaft 32 and the sprocket 34. Thus, the sprocket 34 rotates when the ground driven drive shaft 32 rotates. In this manner, even spacing between distributed seeds is substantially maintained independent of the speed the frame is being moved above the ground because the drum 19 rotates at a speed directly proportional to the speed the frame is moved. Variation in seed spacing can be achieved by varying the spacing of the apertures in the drum, variation of the size of the sprocket used, or a combination of both.

A pair of ring seals 39 are provided. Each ring seal 39 is coupled to an associated one of the first end member 27 and the second end member 29 for facilitating sealed engagement of the cylinder 28 between the first end member 27 and the second end member 29. A distal end 58 of the stationary shaft 52 is threaded. The threaded distal end 58 extends through the second end member 29 when the second end member 29 is positioned to engage the cylinder 28. A tightening member 66 is threadingly couplable to the threaded distal end 58 for facilitating securement of the second end member 29 to the cylinder 28.

In use, the cylinder 28 is interchangeable with other cylinders. Each of the interchangeable cylinders includes apertures arranged and sized such that each the particular cylinder is designed for engaging a pre-selected type of seed.

In use, the appropriate or desired cylinder is selected and installed over the stationary shaft and interior wall assembly. The cylinder is abutted against the first end member and the second end member is pivoted into position abutting the cylinder. The tightening member is then applied to the distal end of the stationary shaft and tightened to hold the cylinder firmly between the first and second end members. The hose is then attached to the distal end of the stationary shaft to provide suction for the first chamber. As the frame is moved over the ground, the drum rotates and seeds are individually picked from the hopper by suction into the first chamber. As the drum continues to rotate, the seeds picked up are moved into position over the distribution tubes and released from the drum as the apertures holding the seed pass between the first chamber and the second chamber.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vacuum seed metering assembly comprising:

a frame adapted for being moved over a ground surface;

a rotatable drum assembly coupled to said frame, said rotatable drum assembly having a perimeter wall, said perimeter wall having a plurality of apertures;

rotational drive means for rotating said rotating drum assembly, said rotational drive means being coupled to said frame;

a seed hopper positioned adjacent said rotatable drum assembly such that said seed hopper is adapted for holding a plurality of seeds adjacent to said perimeter wall;

an interior wall assembly positioned in said rotating drum assembly, said interior wall assembly being coupled to said frame such that said perimeter wall rotates with respect to said interior wall assembly, said interior wall assembly sealingly engaging an interior surface of said rotating drum assembly whereby said interior wall assembly defines a first chamber and a second chamber within said rotating drum assembly;

a vacuum assembly operationally coupled to said rotating drum assembly and in environmental communication with said first chamber whereby individual seeds in said seed hopper are held against said perimeter wall by suction through said apertures when said apertures are adjacent to said first chamber; and a distribution assembly positioned adjacent to said rotating drum assembly and adjacent to said second chamber whereby the seeds held against the perimeter wall are released into said distribution assembly when said apertures are adjacent to said second chamber.

2. The vacuum seed metering assembly of claim 1 wherein said apertures are arranged into a plurality of rows, each of said apertures being evenly spaced between adjacent apertures in each of said plurality of rows.

3. The vacuum seed metering assembly of claim 2 wherein said distribution assembly includes a plurality of distribution tubes, each distribution tube having an opening positioned adjacent to an associated one of said plurality of rows.

4. The vacuum seed metering assembly of claim 1 wherein said rotating drum assembly further comprises:

a first end member rotatably coupled to said frame;

a cylinder forming said perimeter wall, said cylinder being sealingly engageable to said first end member;

a second end member rotatably coupled to a pivot arm of said frame such that said second end member is pivotable to sealingly engage said cylinder such that said first end member, said cylinder and said second end member form a rotatable drum.

5. The vacuum seed metering assembly of claim 4, further comprising:
a pair of ring seals, each ring seal being coupled to an associated one of said first end member and said second end member for facilitating sealed engagement of said cylinder between said first end member and said second end member.

6. The vacuum seed metering assembly of claim 4 wherein said interior wall assembly further comprises:
a stationary shaft extending through said rotating drum assembly;
a pair of walls extending outwardly from said shaft such that said pair of walls form an acute angle between said walls.

7. The vacuum seed metering assembly of claim 6 further comprising:
a distal end of said stationary shaft being threaded, said threaded distal end extending through said second end member when said second end member is positioned to engage said cylinder; and
a tightening member threadingly couplable to said threaded distal end for facilitating securement of said second end member to said cylinder.

8. The vacuum seed metering assembly of claim 4 wherein said cylinder is one of a plurality of interchangeable cylinders, each of said plurality of interchangeable cylinders having apertures arranged and sized such that each said cylinder is adapted for engaging a pre-selected type of seed.

9. The vacuum seed metering assembly of claim 1 wherein said interior wall assembly further comprises:
a stationary shaft extending through said rotating drum assembly;
a pair of walls extending outwardly from said shaft such that said pair of walls form an acute angle between said walls.

10. The vacuum seed metering assembly of claim 9 further comprising:
wall sealing members positioned on edges of said pair of walls and contacting an interior surface of said cylinder for preventing environmental communication between said first chamber and said second chamber.

11. The vacuum seed metering assembly of claim 9 wherein said stationary shaft includes a lumen extending through said stationary shaft;
wherein said vacuum assembly further includes a vacuum source and a hose extending from said vacuum source, said hose being coupled to said stationary shaft such that said vacuum source is in environmental communication with said lumen; and
wherein said stationary shaft includes at least one aperture extending between said lumen and an exterior surface of said stationary shaft, said at least one aperture being positioned such that said vacuum source is in environmental communication with said first chamber.

12. The vacuum seed metering assembly of claim 1 wherein said rotational drive means further comprises:
a ground driven drive shaft coupled to and extending transversely across said frame;
a sprocket rotatably coupled to said frame and rigidly coupled to said rotating drum assembly whereby said rotating drum assembly rotates when said sprocket is rotated; and
a drive chain operationally coupling said ground driven drive shaft and said sprocket whereby said sprocket rotates when said ground driven drive shaft rotates.

13. A vacuum seed metering assembly comprising:
a frame adapted for being moved over a ground surface;
a rotatable drum assembly coupled to said frame, said rotatable drum assembly having a perimeter wall, said perimeter wall having a plurality of apertures;
rotational drive means for rotating said rotating drum assembly, said rotational drive means being coupled to said frame;
a seed hopper positioned adjacent said rotatable drum assembly such that said seed hopper is adapted for holding a plurality of seeds adjacent to said perimeter wall;
an interior wall assembly positioned in said rotating drum assembly, said interior wall assembly being coupled to said frame such that said perimeter wall rotates with respect to said interior wall assembly, said interior wall assembly sealingly engaging an interior surface of said rotating drum assembly whereby said interior wall assembly defines a first chamber and a second chamber within said rotating drum assembly;
a vacuum assembly operationally coupled to said rotating drum assembly and in environmental communication with said first chamber whereby individual seeds in said seed hopper are held against said perimeter wall by suction through said apertures when said apertures are adjacent to said first chamber;
a distribution assembly positioned adjacent to said rotating drum assembly and adjacent to said second chamber whereby the seeds held against the perimeter wall are released into said distribution assembly when said apertures are adjacent to said second chamber;
wherein said apertures are arranged into a plurality of rows, each of said apertures being evenly spaced between adjacent apertures in each of said plurality of rows;
wherein said distribution assembly includes a plurality of distribution tubes, each distribution tube having an opening positioned adjacent to an associated one of said plurality of rows;
wherein said rotating drum assembly further comprises:
a first end member rotatably coupled to said frame,
a cylinder forming said perimeter wall, said cylinder being sealingly engageable to said first end member, and
a second end member rotatably coupled to a pivot arm of said frame such that said second end member is pivotable to sealingly engage said cylinder such that said first end member, said cylinder and said second end member form a rotatable drum;
wherein said interior wall assembly further comprises:
a stationary shaft extending through said rotating drum assembly, and
a pair of walls extending outwardly from said shaft such that said pair of walls form an acute angle between said walls;
wall sealing members positioned on edges of said pair of walls and contacting an interior surface of said cylinder for preventing environmental communication between said first chamber and said second chamber;
wherein said stationary shaft includes a lumen extending through said stationary shaft;
wherein said vacuum assembly further includes a vacuum source and a hose extending from said vacuum source, said hose being coupled to said stationary shaft such that said vacuum source is in environmental communication with said lumen;

wherein said stationary shaft includes at least one aperture extending between said lumen and an exterior surface of said stationary shaft, said at least one aperture being positioned such that said vacuum source is in environmental communication with said first chamber;

wherein said rotational drive means further comprises:
  a ground driven drive shaft coupled to and extending transversely across said frame,
  a sprocket rotatably coupled to said frame and rigidly coupled to said rotating drum assembly whereby said rotating drum assembly rotates when said sprocket is rotated, and
  a drive chain operationally coupling said ground driven drive shaft and said sprocket whereby said sprocket rotates when said ground driven drive shaft rotates;
  a pair of ring seals, each ring seal being coupled to an associated one of said first end member and said second end member for facilitating sealed engagement of said cylinder between said first end member and said second end member;
  a distal end of said stationary shaft being threaded, said threaded distal end extending through said second end member when said second end member is positioned to engage said cylinder;
  a tightening member threadingly couplable to said threaded distal end for facilitating securement of said second end member to said cylinder; and wherein said cylinder is one of a plurality of interchangeable cylinders, each of said plurality of interchangeable cylinders having apertures arranged and sized such that each said cylinder is adapted for engaging a pre-selected type of seed.

* * * * *